United States Patent Office 2,739,607
Patented Mar. 27, 1956

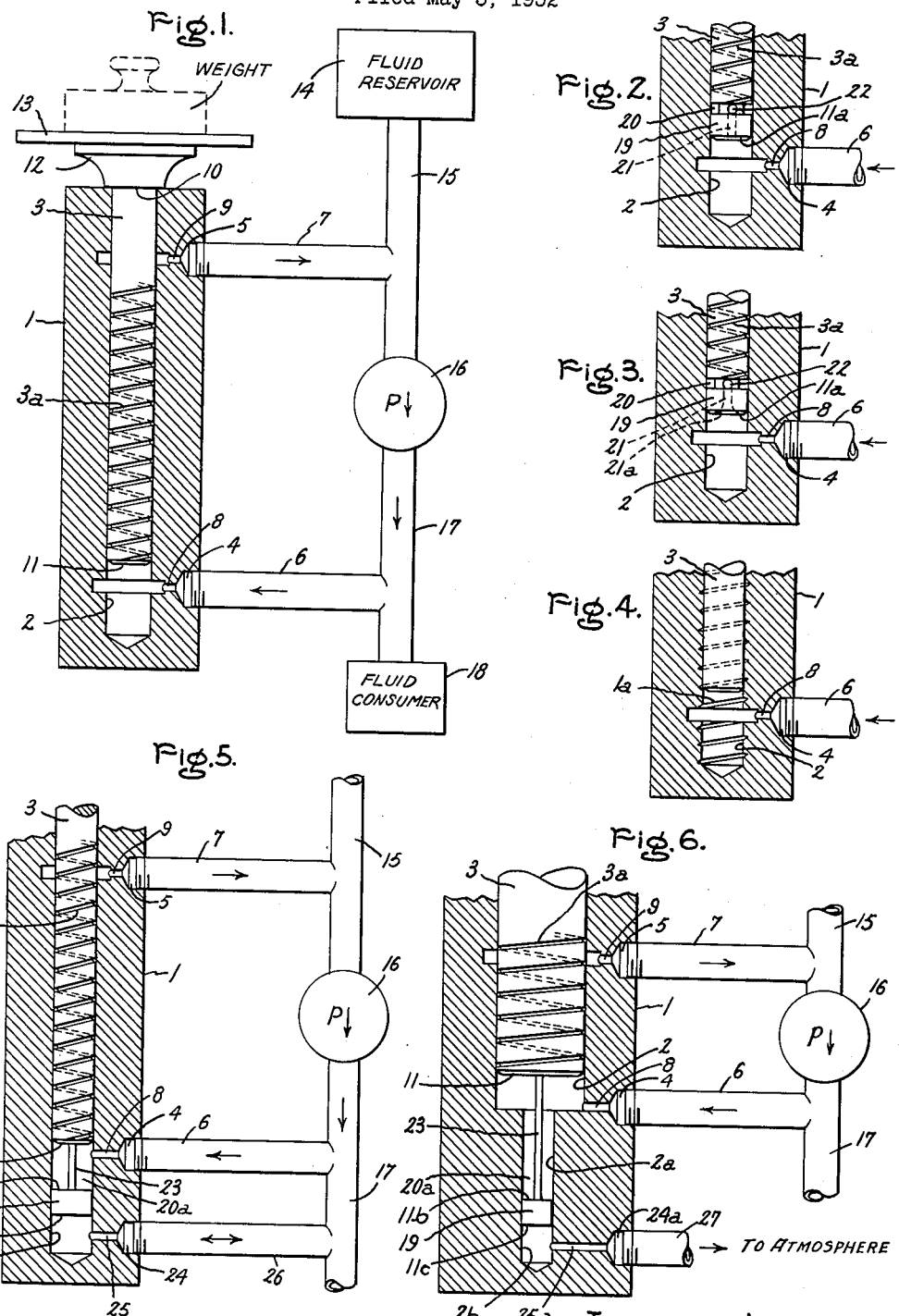

2,739,607

FLUID PRESSURE REGULATING DEVICE

Donald C. Murray, Sharonville, Ohio, assignor to General Electric Company, a corporation of New York Application May 3, 1952, Serial No. 285,983

4 Claims. (Cl. 137—332)

This invention relates to pressure regulating devices and has for its object the provision of an improved regulating means capable of maintaining extremely accurate pressure output.

In modern gas turbine design, it is customary to provide a plurality of combustion chambers connected in parallel instead of employing a single, relatively large combustion chamber for generating hot motive fluid which is utilized to drive a turbine. It will be obvious to those skilled in the art that when a plurality of combustion chambers are employed in this fashion, it is necessary to very carefully match each of the fuel nozzles associated therewith so that each combustion chamber will receive fuel at the same rate at which the fuel is supplied to all of the other chambers. In the operation of gas turbines of the type descibed, the pressure of the fuel supplied to each of the fuel nozzles may vary through an extremely wide pressure range, for example, from about 20 lbs./sq. in. to pressures as high as 500 lbs./sq. in. Accordingly, it is necessary to check the characteristics of each fuel nozzle to be utilized in such apparatus throughout its entire operating range in order to insure that the flow characteristics of each nozzle correspond to the flow characteristics of other nozzles to be utilized for the same purpose. Obviously, during the matching tests which are conducted on each nozzle, it is necessary to accurately set and maintain within extremely close limits the pressure supplied to each nozzle while it is undergoing such a test.

It was found that commercial pressure regulating devices presently on the market were incapable of maintaining the pressure supplied to such fuel nozzles within the desired limits of accuracy. Most pressure regulating devices which are presently commercially available are capable of regulating pressure within 4 to 5% of the desired value. With my improved regulating device it is possible to regulate fluid pressure within small fractions of a percent of the desired value.

Other objects and advantages will be apparent from the following description taken in connection with the accompanying drawings in which Figure 1 is a view, partly in section, of a regulating device in accordance with the invention; Figure 2 is a view, similar to Figure 1, except that means are provided for guiding fluid into the restricted passageway associated with the piston; Figure 3 is similar to Figure 2 with a modified fluid guiding means; Figure 4 is still another modification of the arrangement shown in Figure 1; Figure 5 is still another modification of the arrangement shown in Figure 1 for minimizing the dynamic effect of the flow into the restricted passageway; and Figure 6 is still another modification of the arrangement shown in Figure 1.

Referring now to Figure 1, a housing member 1 is provided with a bore portion 2 for receiving a piston member 3. For reasons which will become apparent as the description proceeds, it is preferable, although not essential, that bore portion 2 be disposed in a vertical direction. A fluid inlet port 4 and a discharge port 5 are provided in housing member 1 for receiving fluid from conduit 6 and for discharging fluid into conduit 7, respectively. Ports 4, 5 communicate with bore portion 2 by means of connecting passageways 8 and 9, respectively.

Piston 3 is slidably disposed in bore portion 2. In order to provide means for establishing communication between ports 4 and 5 at least in some positions of piston member 3, an end portion 3a of the piston member is threaded as indicated in the drawing. When piston member 3 is in the position shown in the drawing, there is no communication between ports 4 and 5 except for the rather small clearance space formed between the walls of housing 1 which form bore portion 2 and the smooth exterior unthreaded portion of piston 3. When piston 3 is in the position shown in Figure 1, no flow will occur from inlet port 4 to discharge port 5 except for some slight leakage which will occur through this leakage space. However, when piston 3 is lifted a sufficient amount so that a portion of threaded portion 3a is adjacent connecting passage 9, it will be seen that communication is established between ports 4 and 5 through connecting passage 8, bore portion 2, threaded portion 3a, and connecting passage 9, the flow passageway formed by threaded portion 3a being in the form of a helix and defined by the walls of adjacent teeth and the surface of bore portion 2.

It will be apparent to those skilled in the art that the passageway formed by threaded portion 3a in cooperation with bore portion 2 constitutes a variable restricting means, the degree of restriction being determined by the position of piston 3 which in turn determines the amount of threaded portion 3a which is disposed between connecting passages 8, 9. It will be seen that when piston 3 is lifted from the position shown in Figure 1 by a relatively small amount, a relatively large amount of threaded portion 3a will be disposed between connecting passages 8 and 9. Therefore, in such a position, the degree of restriction provided by threaded portion 3a will be relatively high and only a small amount of flow will pass from conduit 6 from inlet port 4 to discharge port 5. On the other hand, when piston 3 is lifted a greater amount so that less threaded portion 3a is disposed between connecting passageways 8 and 9, a lesser degree of restriction is thus provided and a greater amount of flow will pass from inlet port 4 to discharge port 5.

A shoulder 10 is provided to limit the movement of piston 3 so that connecting passageway 8 will never be completely or partially block off. In this way, fluid pressure will always be communicated to the face 11 of piston 3 whenever fluid pressure is supplied to inlet port 4. If desired, shoulder 10 may be formed as an integral part of piston member 3, or shoulder 10 may be formed by the provision of a separate member 12 carried by and connected to piston 3. A table member 13 is secured to piston 3 for receiving weighted members in a manner similar to that employed for supporting weighted members in the "dead-weight" type of pressure gauge, a well known device for measuring fluid pressure.

Fluid is supplied from a reservoir 14 through conduit 15 to a pump 16. The pump 16 delivers the fluid under pressure through conduit 17 to a fluid consumer 18. For example, the fluid consumer might be a fluid spray nozzle of the type previously referred to. As will be apparent from Figure 1, conduit 6 is connected to discharge conduit 17 and to inlet port 4 while conduit 7 is connected to inlet conduit 15 and to discharge port 5 so that conduits 6, 7 and the regulator are connected in bypass relation with respect to pump 16 and conduits 15, 17.

In operation with pump 16 delivering fluid under pressure to conduit 17, the pressure existing in conduit 17 is communicated to the face 11 of piston member 3 through conduit 6, connecting passageway 8, and bore portion 2. The fluid pressure acting on face 11 exerts a force tending to move piston member 3 in an upward direction relative to casing member 1. Neglecting the effects of friction for the moment, piston member 3 accordingly will begin to move upward relative to casing 1 until the combined weight of piston member 3, collar 12, table 13, plus the weight of any weights which may be carried by table 13 is equal in magnitude to the upward fluid pressure force exerted against face 11. A condition of equilibrium is reached when the downward weight force is exactly balanced by the upward pressure force and in this condition piston 3 will float at some level above that shown in Figure 1.

When piston 3 is in a floating position, it will be seen that a portion of thread 3a has moved upward and beyond passageway 9. In such position, communication is established between conduits 6 and 7 through passageway 8, bore portion 2, the continuous helical passageway formed between adjacent threads of threaded portion 4 and passageway 9 so that fluid discharged by pump 16 will flow first through conduit 17, then through conduit 6 through the regulator, and is finally returned to inlet conduit 15 by conduit 7. Thus it will be seen that the regulator constitutes a variable flow restricting means wherein the magnitude of flow restriction is dependent upon the length of the threaded portion through which fluid must flow before reaching passageway 9. With a small amount of weight or no weight at all placed upon table 13, piston 3 will float at a relatively high level with a relatively small amount of threaded portion extending below passageway 9. Therefore, the amount of fluid bypassed by the regulator and returned to inlet conduit 15 will be relatively high. On the other hand, if a relatively large weight is supported by table 13, a relatively larger portion of threads 3a will extend below passageway 9 thus presenting a greater restriction to the bypass flow which will then be correspondingly reduced.

Frictional effects are automatically minimized in regulators constructed in accordance with the invention. Originally, vanes were provided on the underside of table 13. These vanes were dished similar to turbine buckets so that a stream of fluid could be directed thereon and thus cause the table and piston 3 to spin and thus insure that the piston would float freely when balanced by the opposed pressure and weight forces. Experiments revealed, however, that separate means for causing rotation of the table and piston 3 were unnecessary, the reaction force produced by fluid leaving the threaded portion when it was discharged into passageway 9 producing sufficient torque to cause piston 3 and table 13 to spin freely.

With pump 16 in operation, and with the proper weight corresponding to the desired pressure to be held in conduit 17 placed on table 13, piston member moves upward if there is an increase in pressure in conduit 17 as previously described and thus reduces the amount of restriction presented to the bypass flow from conduit 6 to conduit 7. Conversely, if the pressure in conduit 17 falls, piston 3 will also fall thus presenting a greater length of thread 3a below passage 9. This additional restriction temporarily reduces the amount of bypass flow until the pressure in conduit 17 returns to the desired value. It will be apparent to those skilled in the art, that threaded portion 3a functions as a very fine control with relatively large axial displacements of piston 3 producing relatively small changes in the overall pressure drop between inlet port 4 and discharge port 5. Thus it will be seen that very small pressure fluctuations in conduit 17 are quickly sensed and corrected for so that the regulator is capable of controlling the pressure in conduit 17 within very close limits. Test results obtained with one regulator designed to bypass approximately .7 gal./min. from a three gallons per minute system and to regulate at 45 lbs./sq. in. clearly indicate that the regulator would hold the system pressure within .015 of one percent while the bypass flow varied from its normal value to a value equal to 19 percent of the normal bypass flow. Other regulators in accordance with the invention have been constructed and have operated satisfactorily at design pressures ranging from 45 to 200 lbs./sq. in. This does not mean, however, that 200 lbs./sq. in should be regarded as the upper limit at which regulators in accordance with the invention will operate satisfactorily. In fact, there appears to be no upper limit at which a regulator constructed in accordance with the invention will cease to function satisfactorily so long as the passages of the regulator are designed to handle the proper amount of flow under normal design conditions. In this connection, by making the threaded portion 3a with larger area threads or of greater pitch (shorter length), the capacity of a given size of regulator piston will be increased. This change will also decrease the amount of lift or piston travel required for control, which may be desirable since the lift in head of fluid being handled by the regulator is the only deviation from the pressure which the regulator is intended to regulate. Likewise, it will also be apparent to those skilled in the art, that some increase in capacity of the regulator can be obtained by increasing the diameter of the piston 3. This effect, however, will be relatively small as compared to the amount of change in capacity that can be obtained by increasing the thread area.

In Figure 2 which is a modified version of the arrangement shown in Figure 1, like elements bear the same notation, and means are provided for guiding the entry of the bypassed fluid from bore portion 2 into threaded portion 3a. In this modification, an unthreaded portion 19 is provided at the lower end of piston member 3. A groove 20 is provided between threaded portion 4 and unthreaded portion 19. Communication is established between the threaded portion 4 and the lower face 11a of piston member 3 so as to provide a guided inlet for the fluid flowing from bore portion 2 into threaded portion 3a by means of an axially extending passageway 21 which communicates with a radial passageway 22 which in turn communicates with groove 20. Figure 3 differs from Figure 2 only in the provision of a flared passageway 21a to provide better guidance of the fluid. Operation of the devices shown in Figures 2 and 3 is in exactly the same manner as the device shown in Figure 1.

Figure 4 shows another modification of the device shown in Figure 1. Again, like elements bear like notation. In the arrangement shown in Figure 4, the threaded portion 1a is an internal thread in the cylinder wall that defines bore portion 2. The piston member 3 is unthreaded throughout its entire length. Operation of the device shown in Figure 4 is substantially in accordance with that of Figure 1 in that between passageway 8 and the face 11 of piston member 3, the flow is through bore portion 2 which presents little or no restriction to the flow of fluid. The level at which piston member 3 floats in housing 1 will determine the length of the threaded portion 1a through which the fluid must then flow before it reaches passageway 9.

In Figure 5, there is shown a still further modification of the invention in which means are provided for minimizing the effect of dynamic forces which may occur at the pressure sensing face 11c of piston member 3. As in the previous figures, like elements bear like notation.

In Figure 5, piston member 3 is provided with an unthreaded portion 19 that is separated from threaded portion 4 somewhat in the same manner as is disclosed in Figures 2 and 3. In Figure 5, however, the groove 20a is of substantial length along the axis of the piston member 3 as compared to the length of groove 20 provided in Figures 2 and 3. Threaded portion 3a and portion 19 are connected by a portion 23 having a smaller diameter than piston 3. Inlet port 4 and connecting passage 8 communicate with the bore portion 2 at a location between the upper face 11b of unthreaded portion 19 and the lower face 11 of threaded portion 3a. The spacing between faces 11b, 11 is chosen and the location of passageway 8 relative thereto is so arranged that passageway 8 will not become blocked in any operating position of piston 3 either by the threaded portion 3a or by the unthreaded portion 19.

Also in Figure 5, the housing 1 is provided with an additional port 24 which communicates with bore portion 2 by a connecting passageway 25. Pressure sensing port 24 is connected to conduit 17 at any convenient location between pump 16 and the fluid consumer 18 by conduit 26.

Operation of the modification shown in Figure 5 is substantially as described in connection with Figures 1-4 but differs in a relatively slight but very important detail. The discharge pressure of pump 16 is sensed through conduit 26, port 24, connecting passage 25 by the lower face 11c of unthreaded portion 19. The flow of bypass fluid is through conduit 6, port 4, connecting passageway 8, through bore portion 2 between faces 11b and 11, then through threaded portion 3a, connecting passageway 9, and finally discharged from the regulator through conduit 7. In this manner, the static pressure of the fluid confined in bore portion 2 between faces 11b and 11 is balanced because the upward force exerted against the face 11 is exactly balanced by the downward force exerted against face 11b. Therefore, the static pressure sensed by the regulator is that sensed by the lower face 11c of unthreaded portion 19. It is to be noted that the pressure sensed by face 11c is truly static since the pressures exerted against faces 11c and 11b are equal so that there will be little if any tendency for leakage flow to occur past unthreaded portion 19 and the walls of housing 1 that define bore portion 2.

Admittedly, dynamic forces due to the flow of fluid will not be completely eliminated by the arrangement shown in Figure 5 since there will be an actual flow of fluid into the first thread of threaded portion 3a. However, this dynamic effect will be relatively small since it is "felt" over a relatively small percentage of the area of face 11. Therefore, any dynamic pressure forces that may be sensed by the regulator will be minimized since sensing of the static pressure is accomplished by the full area of face 11c.

Still another modification is shown in Figure 6 for obtaining greater flow capacity, that is, larger thread area as compared to the effective sensing area of piston member 3.

An unthreaded portion 19 is connected to threaded portion 3a by a connecting portion 23 as described in connection with Figure 5. However, the bore portion of housing 1 is divided into two separate bore portions 2 and 2a of unequal diameters. Likewise, threaded portion 3a and unthreaded portion 19 are also of unequal diameters corresponding to the diameters of bore portions 2 and 2a, respectively. Of course, sufficient clearance is provided between the outer diameters of portions 3a and 19 and the inner diameters of bore portions 2 and 2a and these elements are arranged in coaxial relation so that piston member 3 slides freely in a direction along its axis as well as being free to rotate about its axis.

As previously explained in connection with Fig. 5, passageway 8 is disposed between faces 11b and 11 and the spacing between these faces is such that communication between bore portion 2 and connecting passageway 8 will not be interrupted in any operating position of piston member 3.

Port 24a and connecting passageway 25a are provided as in the arrangement shown in Figure 5. However, 24a is not a pressure sensing port in this case and is connected to the atmosphere by conduit 27. In the arrangement shown in Figure 6, connecting passageway 25a and conduit 27 serve the purpose of collecting and disposing of any slight leakage that may occur past unthreaded portion 19.

As already indicated, by making threaded portion 3a of substantially larger diameter than unthreaded portion 19, greater flow capacity of the regulator can be obtained by the provision of threads of larger cross-sectional area for a given effective sensing area. It will be appreciated by those skilled in the art that the sensing area of the regulator shown in Figure 6 is equal to the cross-sectional area of threaded portion 3a minus the cross-sectional area of unthreaded portion 19. In other words, the effective sensing area of the regulator of Figure 6 is the annular area enclosed within the diameter of threaded portion 3a and having an inner boundary that is circular in shape and equal to the diameter of unthreaded portion 19. Of course, operation of the embodiment shown in Figure 6 is identical to the embodiment shown in Figure 1 except that slight leakage that may occur past unthreaded portion 19 is caused to flow into conduit 7 through connecting passageway 25a and conduit 27.

While particular embodiments of the invention have been illustrated and described, it will be obvious to those skilled in the art that various changes and modifications may be made without departing from the invention and it is intended to cover in the appended claims all such changes and modifications that come within the true spirit and scope of the invention.

What I claim as new and desire to secure by Letters Patent of the United States is:

1. A pressure regulator having in combination a housing member having a longitudinally extending bore with spaced inlet and discharge ports communicating with said bore, said bore being vertically disposed, a piston member extending into said bore slidably and rotatably disposed therein, said piston member having a helical threaded portion and cooperating with the housing member to form a fluid passageway between said inlet and discharge ports, the length of the passageway being dependent on the relative vertical position of said members as determined by the difference between the fluid force and the gravity force acting on the piston member, a weight supporting table member supported by the piston member, means for supplying a fluid under pressure to said inlet port, said fluid passing through the fluid passageway formed by the helical threaded portion of said piston member to impart a rotary motion to said piston and weight supporting table member due to the reaction force produced by the fluid leaving the threaded portion of the piston.

2. Apparatus in accordance with claim 1 wherein the piston member has an end portion disposed within said bore between the respective locations at which the inlet and discharge ports communicate therewith.

3. Apparatus in accordance with claim 1 including a second unthreaded piston member coaxial with the first piston member and connected to the threaded lower end portion thereof and spaced therefrom, the inlet port communicating with said bore at a location between the first and second piston members, and a pressure sensing port communicating with said bore at a location below said second piston member.

4. Apparatus in accordance with claim 1 including a second bore having a smaller cross sectional area than that of the first bore and disposed coaxially below and in communication therewith, a second piston member within the second bore and connected to said first piston, and a drain port communicating with the second bore at a location below the second piston member.

References Cited in the file of this patent

UNITED STATES PATENTS

| | | |
|---|---|---|
| 156,165 | Jonson | Oct. 20, 1874 |
| 799,732 | Harsen | Sept 19, 1905 |
| 1,427,600 | Justus | Aug. 29, 1922 |
| 1,712,791 | Gallagher | May 14, 1929 |
| 1,861,017 | Lake | May 31, 1932 |
| 1,976,820 | Wettstein | Oct. 16, 1934 |
| 2,303,590 | Towler | Dec. 1, 1942 |
| 2,496,214 | Johnson | Jan. 31, 1950 |